(12) United States Patent
Gonda et al.

(10) Patent No.: US 7,122,071 B1
(45) Date of Patent: Oct. 17, 2006

(54) CENTRIFUGAL ADSORPTION SYSTEM (75) Inventors: Steve R. Gonda, Houston, TX (US); Yow-Min D. Tsao, Friendswood, TX (US); Wenshan Lee, Houston, TX (US)

(73) Assignee: The United States of America as represented by the Administrator of the National Aeronautics and Space Administration, Washington, DC (US)

(*) Notice: Subject to any disclaimer, the term of this patent is extended or adjusted under 35 U.S.C. 154(b) by 87 days.

(21) Appl. No.: 10/263,280

(22) Filed: Sep. 25, 2002

(51) Int. Cl.
*B01D 19/00* (2006.01)

(52) U.S. Cl. .................. 95/46; 95/261; 96/6; 96/208; 96/216

(58) Field of Classification Search .............. 95/46, 95/261; 96/6, 208, 216
See application file for complete search history.

(56) References Cited

U.S. PATENT DOCUMENTS

| | | | | |
|---|---|---|---|---|
| 1,863,111 A | * | 6/1932 | Greve | 96/216 |
| 3,201,919 A | * | 8/1965 | Long | 95/254 |
| 3,402,529 A | | 9/1968 | Frantz | |
| 3,803,810 A | | 4/1974 | Rosenberg | |
| 3,887,741 A | | 6/1975 | Dwyer | |
| 3,950,152 A | | 4/1976 | Guon | |
| 3,985,522 A | | 10/1976 | Kuhlmann | |
| 4,629,475 A | | 12/1986 | McArdle et al. | |
| 4,976,754 A | | 12/1990 | Edelstein et al. | |
| 5,037,454 A | | 8/1991 | Mann | |
| 5,037,562 A | | 8/1991 | Tarves, Jr. | |
| 5,051,118 A | | 9/1991 | Andreae | |
| 5,244,478 A | | 9/1993 | Jolly | |
| 5,334,239 A | | 8/1994 | Choe et al. | |
| 5,387,278 A | | 2/1995 | Mangialardi | |
| 5,484,521 A | | 1/1996 | Kramer | |
| 5,531,811 A | | 7/1996 | Kloberdanz | |
| 5,575,832 A | | 11/1996 | Boyd | |
| 5,575,904 A | | 11/1996 | Suzuki | |
| 5,591,243 A | | 1/1997 | Colussi et al. | |
| 5,622,545 A | | 4/1997 | Mazzei et al. | |
| 5,698,014 A | | 12/1997 | Cadle et al. | |
| 5,755,965 A | | 5/1998 | Reiber | |
| 5,810,081 A | | 9/1998 | Cobb et al. | |
| 5,866,000 A | | 2/1999 | Yeh | |
| 5,871,645 A | | 2/1999 | Reed et al. | |
| 5,902,378 A | | 5/1999 | Obrejanu | |

\* cited by examiner

*Primary Examiner*—Duane Smith
*Assistant Examiner*—Douglas Theisen
(74) *Attorney, Agent, or Firm*—Theodore U. Ro (57) ABSTRACT

A gas-liquid separator uses a helical passageway to impart a spiral motion to a fluid passing therethrough. The centrifugal force generated by the spiraling motion urges the liquid component of the fluid radially outward which forces the gas component radially inward. The gas component is then separated through a gas-permeable, liquid-impervious membrane and discharged through a central passageway. A filter material captures target substances contained in the fluid.

21 Claims, 6 Drawing Sheets

CENTRIFUGAL ADSORPTION SYSTEM

ORIGIN OF THE INVENTION

The invention described herein was made by employees of the United States Government and may be manufactured and used by or for the government of the United States of America for governmental purposes without the payment of any royalties thereon or therefor.

BACKGROUND OF THE INVENTION

The invention relates generally to the separation of gases and liquids in a fluid, and more particularly, to a gas-liquid separator that uses centrifugal force to separate the gas from the liquid while at the same time capturing one or more target substances in the fluid.

The formation of gas bubbles in the fluid of any equipment or hardware system designed to contain such fluids can significantly degrade the performance of the equipment or system. The gas bubble problem is particularly acute in low or zero-gravity environments such as in outer space where there is no gravitational force to pull the denser liquid components down and consequently force the less dense gas components up. Thus, the gas bubbles remain suspended within the fluid instead of rising to the top as would be the case in normal (1–g) gravity. For example, formation of gas bubbles have been consistently observed in space bioreactors which are cell culture vessels used to cultivate cells in space. The gas bubbles displace nutrient-rich fluids that provide nutrients for the cells and severely disrupt the flow dynamics of the fluid within the vessel. Accordingly, it is desirable to be able to remove or eliminate gas bubbles from the fluid in such bioreactor vessels.

Moreover, certain valuable bioproducts in the culture fluid flowing through the bioreactor vessel may need to be recovered and stored while other substances such as nutrients should remain in the fluid. Further, it is often necessary to store the target substances in such a way as to preserve their structural and functional integrity while staying within the limited resources and confines of spaceflight conditions. Accordingly, it is also desirable to be able to capture specific substances contained in the culture fluid and conveniently store the same while allowing other substances to pass.

One prior art method of removing gas bubbles from the bioreactor vessels involves subjecting the vessel to high-speed rotation. However, the high rotation speed may degrade the low-shear fluid dynamics of the environment in the vessel (necessary for cultivation of mammalian cells) and compromise the experiment.

Another prior art method of separating gas and liquid applies centrifugal force to the fluid to separate the heavier liquid components from the lighter gas components. Such methods typically employ a helical passageway to impart a spiraling motion to the fluid passing therethrough. The centrifugal force generated by the spiraling motion drives the heavier liquid components radially outward, separating them from the lighter gas components, which are forced toward the center of the passageway. The liquid and gas components are then discharged through different outlets. However, the fluid at the center of the passageway may still have some gas mixed therein because there is no barrier in the passageway physically preventing the liquid from mixing with the gas.

Moreover, the inventors are aware of no prior art method as yet that both removes gas from a fluid and at the same time captures certain selected substances contained in the fluid. Therefore, there exists a need for an apparatus and method of removing gas from a fluid which will preserve the low-shear environment and prevent the gas from mixing with the fluid at the boundary therebetween while at the same time capturing specific substances contained in the fluid.

SUMMARY OF THE INVENTION

The invention provides a low-shear method and apparatus for removing gas from a fluid mixture and capturing certain substances contained in the fluid mixture, wherein the gas components are physically separated from the liquid components.

In one aspect, the invention relates to a method of removing gas from a fluid mixture, comprising receiving the fluid mixture within a cylindrical chamber, advancing the fluid mixture in a helical path through the chamber such that the liquid component is urged radially outward while the gas component is urged radially inward, capturing a target substance from the fluid; filtering the gas component from the liquid component, and discharging the gas component from the chamber.

In another aspect, the invention relates to an apparatus for removing gas from a fluid mixture comprising a cylindrical housing. The apparatus further comprises a spiral core mounted on a hollow, perforated spiral core support member and housed within the cylindrical housing, a filter disposed in between spiral disks of the spiral core, and a membrane layer coaxially adjacent to the hollow, perforated spiral core support member.

In yet another aspect, the invention relates to apparatus for removing gas from a fluid mixture containing a gas component and a liquid component. The apparatus comprises means for receiving the fluid mixture in a cylindrical housing, means for advancing the fluid mixture in a helical path through the chamber such that the liquid component is urged radially outward while the gas component is urged radially inward, means for capturing a target substance from the fluid, means for filtering the gas component from the liquid component, and means for discharging the gas component.

In still another aspect, the invention relates to an apparatus for removing gas from a fluid mixture containing a gas component and a liquid component. The apparatus comprises a cylindrical housing, a first inner flange and a second inner flange coaxially attached to a proximal end and a distal end, respectively, of the cylindrical housing, and first and second outer flanges connectable to the first and second inner flanges, respectively. Each of the first and second outer flanges has a port therein for providing fluid communication with the cylindrical housing. The apparatus further comprises a spiral core mounted on a hollow, perforated spiral core support member and housed in the cylindrical housing, a filter disposed in between spiral disks of the spiral core, a membrane layer disposed adjacent to an inner surface of the hollow, perforated spiral core support member and supported by a hollow, perforated membrane support member, and an annular seal between the first inner flange and the first outer flange and between the second inner flange and a second outer flange, the annular seal disposed in an annular groove formed in each of the first and second outer flanges.

DETAILED DESCRIPTION OF THE INVENTION

Following is a detailed description of the various embodiments of the invention. Throughout the description, the term "fluid" is used to mean a mixture which may contain both a liquid component and a gas component.

In general, the invention employs centrifugal force and a gas-permeable barrier to separate gas from a fluid mixture containing gas components and liquid components. The invention also employs a filter which captures certain selected materials contained in the fluid mixture. As the fluid mixture flows through a helical path, the centrifugal force therefrom drives the liquid components radially outward which consequently forces the gas components radially inward. The gas components pass through the gas-permeable barrier and are discharged into the environment.

Figure 1:
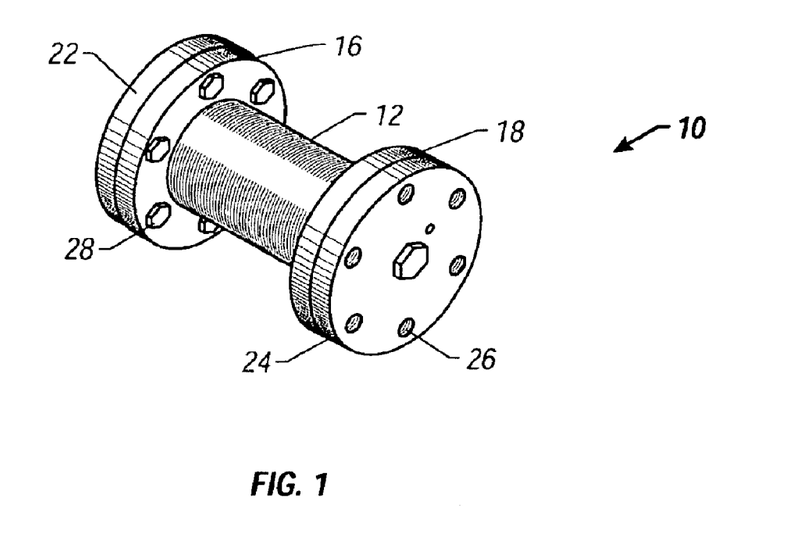
FIG. 1 illustrates a perspective view of the invention.

Referring now to FIG. 1, a fully assembled centrifugal adsorption cartridge 10 has a cylindrical housing 12 which is connected at its proximal and distal ends to a first inner flange 16 and a second inner flange 18, respectively, as shown. The cylindrical housing 12 and the first inner and outer flanges 16, 18 together define a fluid passageway 14 (shown in FIG. 2) through the cylindrical housing 12. The first inner flange 16 is in turn connected to a first outer flange 22 and the second inner flange 18 is connected to a second outer flange 24. In some embodiments, the cylindrical housing 12 and the first and second inner flanges 16, 18 are formed from a single piece, while in other embodiments they may be made of separate pieces which are then connected together during assembly of the centrifugal adsorption cartridge 10. A set of holes 20 (shown in FIG. 2) are formed in the first and second inner flanges 16, 18, and a corresponding set of holes 26 are formed in the first and second outer flanges 22, 24. The holes 20 and 26 are adapted to receive one or more screws 28 for connecting the first inner flange 16 to the first outer flange 22 and the second inner flange 18 to the second outer flange 24, as shown. Although screws 28 are used in this embodiment, alternative means for connecting or otherwise attaching the inner flanges 16, 18 to the outer flanges 22, 24 together may certainly be used.

Figure 2:
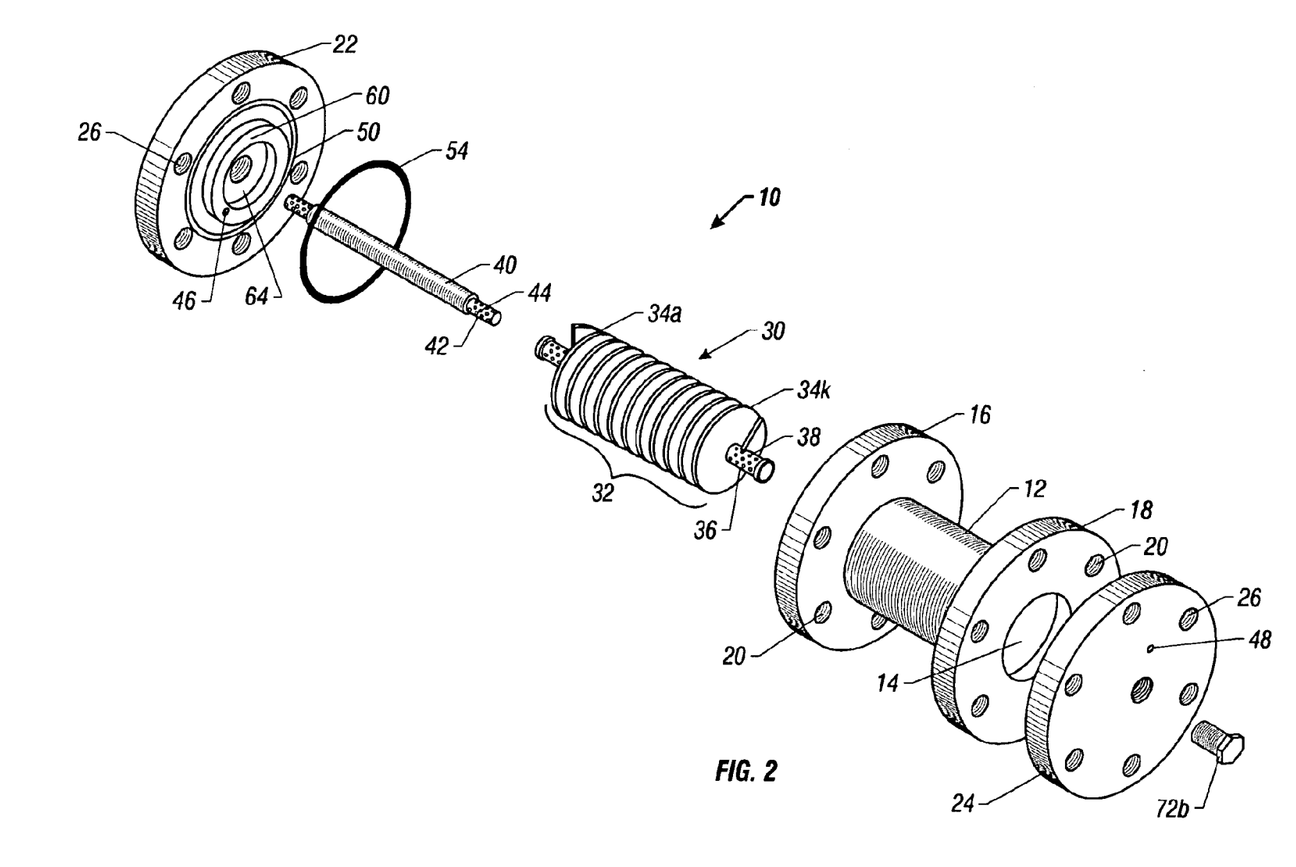
FIG. 2 illustrates an exploded view of the invention.

Referring now to FIG. 2, in addition to the components previously described, the centrifugal adsorption cartridge 10 further includes a spiral assembly 30 having a spiral core 32 made of a plurality of spiral disks 34a–34k. The spiral disks 34a–34k are evenly spaced relative to one another and are mounted on a hollow, perforated tubular spiral core support member 36. The perforations 38 in the spiral core support member 36 are shown as holes in this embodiment, but may be in the form of slits or other types of openings. Also, although eleven spiral disks 34a–34k are shown here, other embodiments may have fewer or more spiral disks that may be evenly or unevenly spaced within a given area, depending on the particular need of the application.

The centrifugal adsorption cartridge 10 further includes a membrane 40 which is attached to, or mounted on, a hollow, perforated tubular membrane support member 42. The perforations 44 in the membrane support member 42 may be holes as shown here, or may be slits, or any other suitable openings. The membrane 40 and membrane support member 42 are of such dimensions so as to coaxially fit inside the spiral core support member 36. Similarly, the entire spiral assembly 30 is of such dimensions as to coaxially fit inside the cylindrical housing 12.

It is preferable the membrane 40 be made of a material that is gas-permeable, but liquid-impervious so only gas may pass therethrough. The other components of the centrifugal adsorption cartridge 10, however, may be made of any material suitable for the particular application. For example, in an application involving corrosive fluids, the cylindrical housing 12, spiral disks 34a–34k, spiral core support member 36, etc., should be made of steel or other types of corrosive-resistant materials.

Figure 3:
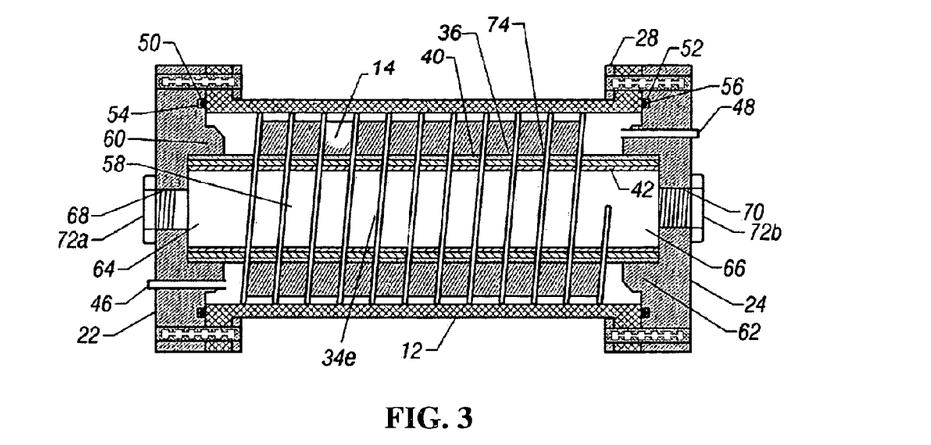
FIG. 3 illustrates a partially-longitudinal-sectional view of one embodiment of the invention wherein the spiral discs, such as representative disc 34(e), remain unsectioned for enhanced clarity.

Referring now to FIG. 3 (with continued reference to FIG. 2), the first outer flange 22 has a port 46 formed therein for allowing fluid to flow into or out of the fluid passageway 14 in the cylindrical housing 12. Likewise, the second outer flange 24 has a port 48 for allowing fluid to enter and exit the cylindrical housing 12. The first and second outer flanges 22, 24 also have annular grooves 50, 52 formed therein for receiving annular, elastomeric rings or seals 54, 56. The seals 54, 56 form a fluid-tight contact between the inner flanges 16, 18 and the first and second outer flanges 22, 24. Each of the first and second outer flanges 22, 24 also has an annular shoulder 60, 62 formed therein which defines an annular recess 64, 66 for receiving the ends of the spiral core support member 36. The first and second outer flanges 22, 24 further include openings 68, 70 which, in conjunction with the membrane support member 42, forms a gas passageway 58 in which gas may be collected and discharged from the centrifugal adsorption cartridge 10. Cap screws 72a, and 72b may be inserted into either or both of the openings 68, 70 to prevent or control the exit of the gas from the centrifugal adsorption cartridge 10. A filter material 74 is packed into the cylindrical housing 12 in between the spiral disk 34a–34k as shown.

In operation, fluid is pumped or otherwise introduced into the centrifugal adsorption cartridge 10 through one of the ports 46, 48. Once the fluid enters the cylindrical housing 12, it follows a helical path defined by the spiral disks 34a–34k that make up the spiral core 32. The fluid passes through the filter material 74 which captures certain selected bioproducts in the filter material 74. In one embodiment, the filter material 74 is preferably coated with a ligand which is effective to capture particular biological agents (e.g., vitamin D, or EPO). In other embodiments, however, the filter material 74 is made of any suitable fibrous, adsorbent material which can easily conduct fluid therethrough while capturing specific substances which are contained in the fluid.

As the fluid flows along the helical path, the centrifugal force generated therefrom drives the heavier liquid component radially outward, which forces the lighter gas component radially inward. The inwardly moving gas component passes through the perforations 38 in the spiral core support member 36, is filtered through the membrane 40, passes through perforations 44 in the membrane support member 42, and into the gas passageway 58. The fluid, which is now substantially free of the gas component, exits the centrifugal adsorption cartridge 10 through one of the previously described ports 46, 48 formed in the outer flanges 22, 24.

The gas component in the gas passageway 58 is discharged from the centrifugal adsorption cartridge 10 through one of the previously described openings 68, 70 formed in the outer flanges 22, 24. In some embodiments, the gas component is discharged directly into an external environment by simply exposing the gas to the environment such that the gas naturally diffuses into the external environment. In other embodiments, the gas component is discharged by reducing the air pressure in the vicinity of one of the openings 68, 70.

By virtue of the symmetrical shape and even spacing of the spiral disks 34a–34k, the centrifugal adsorption cartridge 10 is bi-directional, i.e., the direction of the fluid flow does not affect the utility or efficiency of the centrifugal adsorption cartridge 10. However, in other embodiments, the spacing and shapes of the spiral disks 34a–34k may be adjusted to maximize the fluid flow rate in a particular direction or in a particular section (e.g., the middle) of the cylindrical housing 12.

Figure 4:
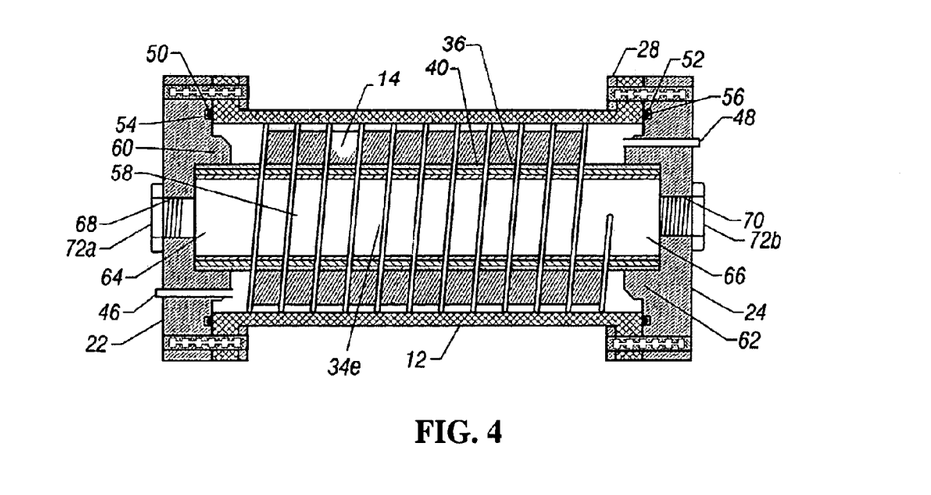
FIG. 4 illustrates a partially-longitudinal-sectional view of another embodiment, similar to the embodiment of FIG. 3, but without a membrane support member, and wherein the spiral discs, as represented by disc 34(e), have not been sectioned in order to enhance the clarity of the drawing.

Referring now to FIG. 4, in another embodiment, the membrane 40 is not mounted on the membrane support member 42, but is instead attached to the inner surface of the spiral core support member 36 and supported thereby.

Figure 5:
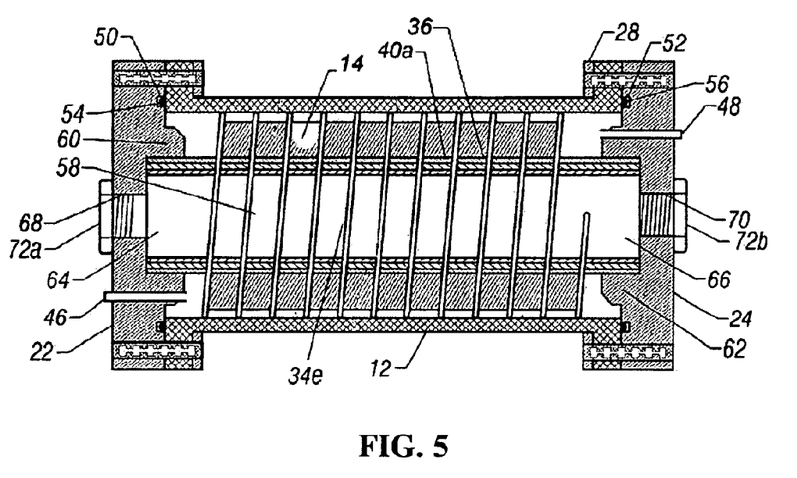
FIG. 5 illustrates a partially-longitudinal-sectional view of yet another embodiment, similar to the embodiment of FIGS. 3 and 4, wherein the membrane is in between the spiral disks, as represented by disc 34(e), again remain unsectioned for enhanced clarity.

Referring to FIG. 5, in yet another embodiment, a membrane 40a is attached to the outer surface of the spiral core support member 36. In this embodiment, the membrane 40a may be in the form of a strip that is wound around the spiral core support member 36 in between the spiral disks 34a–34k. The membrane 40a shown here is made of substantially the same material as the membrane 40 shown in FIGS. 3–4.

Figure 6:
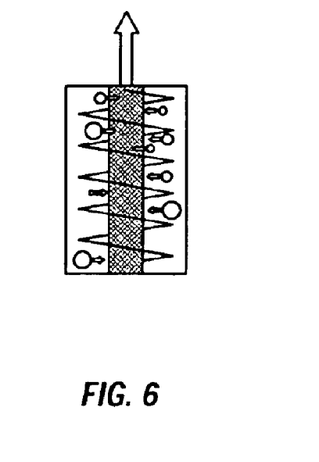
FIG. 6 illustrates the effect of centrifugal force on the gas bubbles.

FIG. 6 is a graphical representation of the effects of centrifugal force on gas bubbles in a fluid flowing through the centrifugal adsorption cartridge 10. As the fluid flows through the helical path, gas bubbles are forced toward the center (shown by arrows) due to the centrifugal force acting on the heavier liquid components. Although the invention was originally designed for low or zero-gravity applications, it should be clear the principles and concepts disclosed herein are equally applicable to normal gravity environments.

Figure 7A:
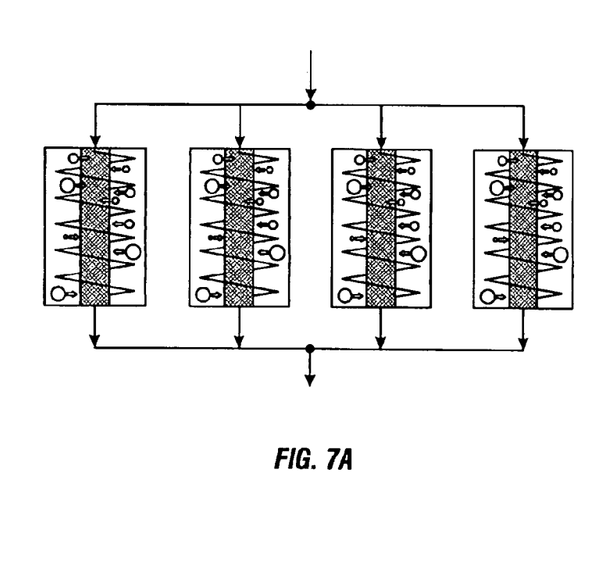
FIGS. 7A–7B show parallel and series configurations of the invention.
Figure 7B:
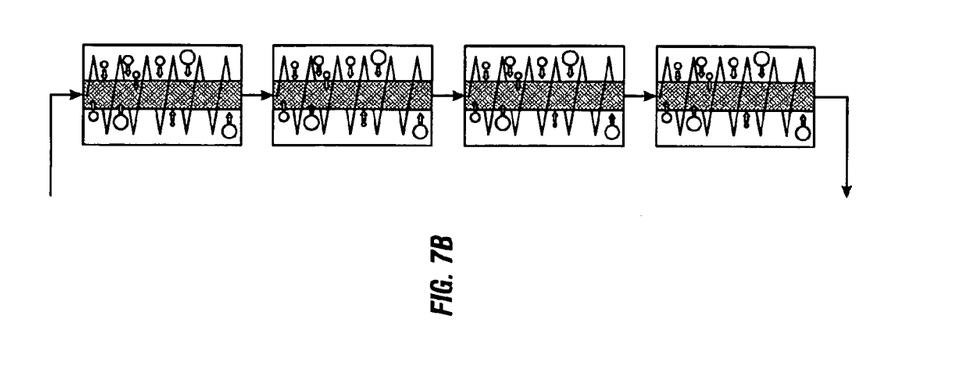

The quality of the fluid from which gas is removed may be improved by connecting multiple centrifugal adsorption cartridges in series as shown in FIG. 7B. Each additional centrifugal adsorption cartridge removes any gas and captures any target substance not previously removed and captured by the centrifugal adsorption cartridges upstream. Alternatively, the quantity of the fluid from which gas is removed may be increased by connecting multiple cartridges in parallel as shown in FIG. 7A. Each additional centrifugal adsorption cartridge allows that much more fluid to be processed at the same time.

As has been previously noted, different configurations of the spiral core are possible. For example, and as will be understood by those in the art, the spiral core may have a relatively tight spacing, not shown, of the spiral disks which defines a longer helical path through the centrifugal adsorption cartridge, while in another configuration, not shown, the spiral core has a relatively loose spacing, not shown, of the spiral disks which, as will also be understood by those in the art, defines a shorter helical path through the centrifugal adsorption cartridge. Also, as in the embodiment illustrated in the drawings, the spiral disks of the spiral core may have a spacing that is intermediate that of the two above-mentioned configurations.

Figure 8:
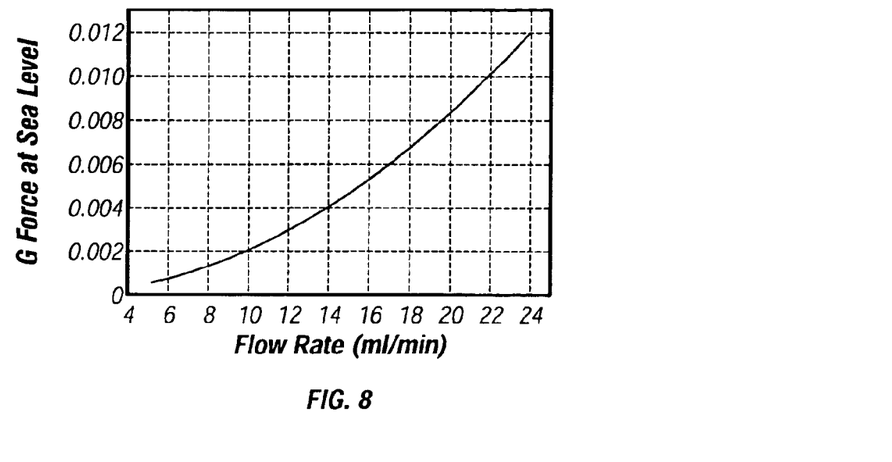
FIG. 8 is a graphical representation of flow rate vs. gravitational forces.
Figure 9:
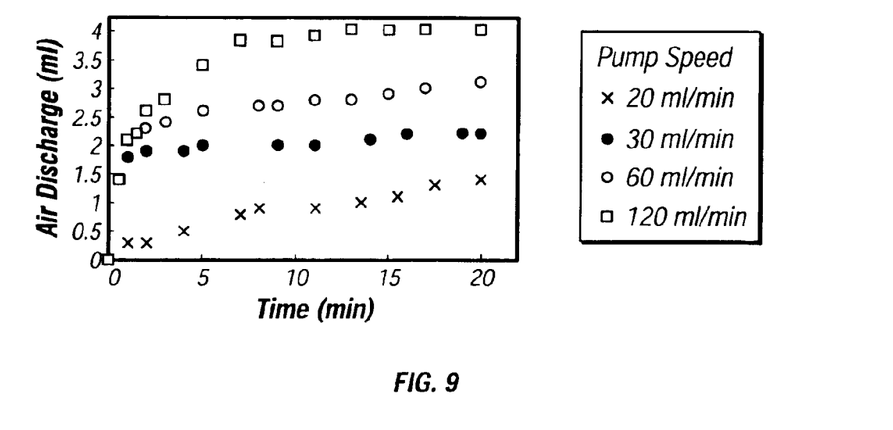
FIG. 9 is a graphical representation of the relationship of pump speed to air discharge over time.

The different spacing of the spiral disks discussed above also results in the generation of varying amounts of centrifugal force, because the fluid will flow through the centrifugal adsorption cartridge at different flow rates depending upon the spacing of the spiral disks. As may be seen in FIG. 8, the centrifugal G forces increase as the flow rate increases. As will be understood by those in the art, the amount of centrifugal force generated increases more rapidly for tightly spaced spiral disks than for configurations employing more loosely spaced spiral disks, in that, from basic and well-known principles of physics and fluid flow, the flow path is shortened and made more acute.

Advantages of the centrifugal adsorption cartridge include a passive (i.e., no external power needed), low-shear method and apparatus for removing gas from a fluid that also physically separates the gas components from the liquid components. In addition, the cartridge may be used to capture preselected target substances contained in the fluid. When a cartridge is full, or when it is desired to store the captured substance, the cartridge may be easily removed and conveniently stored and a replacement cartridge inserted into place. Furthermore, the cartridge may be easily scaled larger or smaller to suit the size requirement of a particular application without affecting the utility thereof.

It is to be understood that the various embodiments described herein are illustrative only, and that other embodiments may be derived without departing from the scope and spirit of the invention. Accordingly, the invention should be limited only by the following claims.

What is claimed is:

1. A method of removing gas from a fluid mixture containing a liquid component and a gas component, comprising;

receiving the fluid mixture in a cylindrical chamber;

advancing the fluid mixture in a substantially helical path through the chamber such that the liquid component is urged radially outward while the gas component is urged radially inward;

capturing a target substance from the fluid mixture;

filtering the gas component from the liquid component; and     discharging the gas component from the chamber.

2. The method of claim 1, wherein discharging the gas component comprises reducing an air pressure at a gas component outlet.

3. The method of claim 1, wherein discharging the gas component comprises exposing the gas component directly to an environment external to the chamber.

4. The method of claim 1, wherein receiving the fluid mixture comprises pumping the fluid mixture into the chamber.

5. The method of claim 1, wherein receiving the fluid mixture comprises allowing the fluid mixture to flow under its own weight into the chamber.

6. The method of claim 1, further comprising sealing the chamber to prevent leakage of the fluid mixture.

7. An apparatus for removing gas from a fluid mixture containing a gas component and a liquid component, comprising:
- a cylindrical housing;
- a spiral core mounted on a hollow, perforated spiral core support member and housed within the cylindrical housing;
- a membrane layer coaxially disposed adjacent to the hollow, perforated spiral core support member; and
- a filter disposed in between spiral disks of the spiral core.

8. The apparatus of claim 7, wherein the membrane layer is gas-permeable and liquid-impervious.

9. The apparatus of claim 7, wherein the filter is coated with a ligand.

10. The apparatus of claim 7, wherein the membrane layer is adjacent to an inner surface of the hollow, perforated spiral core support member.

11. The apparatus of claim 7, wherein the membrane layer is adjacent to an outer surface of the hollow, perforated spiral core support member.

12. The apparatus of claim 7, wherein the membrane layer is supported by a hollow, perforated membrane support member disposed coaxially within the hollow, perforated spiral core support member.

13. The apparatus of claim 7, further comprising first and second inner flanges attached to proximal and distal ends, respectively, of the cylindrical housing.

14. The apparatus of claim 13, further comprising first and second outer flanges connectable to the first and second inner flanges, respectively.

15. The apparatus of claim 14, further comprising an elastomeric annular seal between the first inner flange and the first outer flange and between the second inner flange and the second outer flange.

16. The apparatus of claim 15, wherein each of the first and second outer flanges has an annular groove formed therein for receiving the elastomeric seal.

17. The apparatus of claim 14, wherein each of the first and second outer flanges has an annular shoulder defining a recess therein for receiving the hollow, perforated spiral core support member.

18. The apparatus of claim 7, further comprising an inlet for providing fluid communication with the cylindrical housing.

19. An apparatus for removing gas from a fluid mixture containing a gas component and a liquid component, comprising:
- means for receiving the fluid mixture in a cylindrical chamber;
- means for advancing the fluid mixture in a substantially helical path through the chamber such that the liquid component is urged radially outward while the gas component is urged radially inward;
- means for capturing a target substance from the fluid;
- means for filtering the gas component from the liquid component; and
- means for discharging the gas component from the chamber.

20. The apparatus of claim 19, further comprising means for sealing the chamber to prevent leakage of the fluid mixture.

21. An apparatus for removing gas from a fluid mixture containing a gas component and a liquid component, comprising:
- a cylindrical housing;
- a first inner flange and a second inner flange coaxially attached to a proximal end and a distal end, respectively, of the cylindrical housing;
- a spiral core mounted on a hollow, perforated spiral core support member and housed within the cylindrical housing;
- a ligand coated filter disposed in between spiral disks of the spiral core;
- a membrane layer coaxially disposed adjacent to an inner surface of the hollow, perforated spiral core support member and supported by a hollow, perforated membrane support member;
- first and second outer flanges connectable to the first and second inner flanges, respectively, each of the first and second outer flanges having a port therein for providing fluid communication with the cylindrical housing;
- an annular seal between the first inner flange and the first outer flange and between the second inner flange and a second outer flange, the annular seal disposed in an annular groove formed in each of the first and second outer flanges.

* * * * *